INVENTORS
D.R. WITT
J.P. HOGAN

BY *Young & Quigg*

ATTORNEYS

United States Patent Office 3,541,072
Patented Nov. 17, 1970

3,541,072
CATALYST TREATMENT
Donald R. Witt and John P. Hogan, Bartlesville, Okla.,
assignors to Phillips Petroleum Company, a corporation of Delaware
Filed Feb. 8, 1968, Ser. No. 704,166
Int. Cl. C08f 1/66, 3/06
U.S. Cl. 260—93.7                                    10 Claims

ABSTRACT OF THE DISCLOSURE

A catalytic composition containing chromium oxide is prepared by heating at a temperature of from about 1500 to about 1800° F. in contact with a gas having a substantially inert portion and an oxidizing portion, the oxidizing portion of said gas contributing to said gas from 7 to no more than 19 mol percent oxygen based on the total gas.

---

This invention relates to a new and improved method for preparing a catalytic composition. This invention also relates to a new and improved polymerization process.

High molecular weight polymers of 1-olefins such as ethylene and propylene are prepared using a chromium oxide-containing catalyst in either a solution process wherein the polymer is formed dissolved in a solvent, or a particle-form process wherein the polymer is obtained as particles in a slurry in the polymerization diluent. These two polymerization processes are fully and completely disclosed in U.S. Pat. 2,825,721, and British Pat. 853,414, the disclosures of which are hereby incorporated herein by reference.

Heretofore, it has been possible to obtain higher melt index polymers using the solution process than could be obtained using the particle-form process. High melt index polymers are desirable for paper coating applications, and for use as a microcrystalline wax. It is also desirable, from an economic point of view, to be able to obtain polymers having the full desired range of melt index, including the high melt index polymers, using only the particle form process.

It has now been found that high melt index polymers useful for coating paper and other similar substrates, and useful as a microcrystalline wax, can be obtained from a chromium oxide catalyst using either the solution or the particle form process if the catalytic composition is prepared by heating same at a temperature of from about 1500 to about 1800° F. for at least one minute in contact with a gas which has a substantially inert portion and an oxidizing portion which oxidizing portion contributes to the total gas from 7 to no more than 19 mol percent oxygen.

Also according to this invention a new and improved catalyst composition is obtained using the catalyst preparation process mentioned hereinabove.

Further in accordance with this invention, there is provided a polymerization process using the catalyst prepared in accordance with the process set forth hereinabove.

The catalyst of this invention is useful for making polyethylene, polypropylene, and the like, and such polymers are useful for coating paper to make same heat sealable and grease or oil resistant, and as a substitute for commercial microcrystalline waxes used for polishing a surface.

Accordingly, it is an object of this invention to provide a new and improved method for preparing a catalytic composition such as a chromium oxide-containing catalytic composition. It is another object of this invention to provide a new and improved process for activating a catalytic composition so that the resulting catalyst can be employed either in a solution or particle form process and still produce a high melt index polymer. It is another object of this invention to provide a new and improved activation process for chromium oxide-containing catalysts, especially chromium catalysts wherein at least a portion of the chromium is in the hexavalent state. It is another object of this invention to provide a new and improved catalytic composition, particularly a chromium oxide-containing catalyst. It is another object of this invention to provide a new and improved method for polymerizing monomers such as 1-olefins using the new and improved catalytic composition of this invention.

Other aspects, objects and the several advantages of this invention will be apparent to those skilled in the art from the description, drawing, and appended claims.

Throughout the discussion of this invention, whenever the term "melt index" is employed, what is meant, unless otherwise indicated, is the melt index determined in accordance with ASTM D-1238-62T, Condition E.

Figure 1:
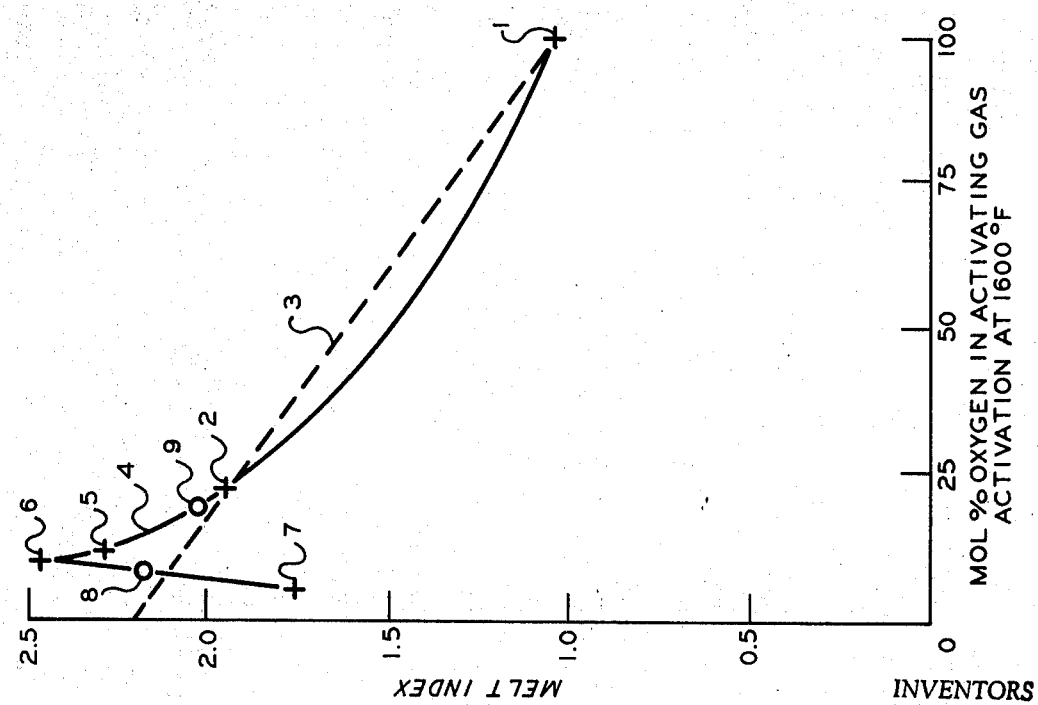
FIG. 1 is a curve showing the unexpected results obtained by this invention in the form of a peak of increased polymer melt index obtained when activating a chromium oxide-containing catalyst using an activating gas containing from 7 to no more than 19 mol percent oxygen, and an activation temperature in an excess of 1500° F.

FIG. 1 shows that when activating a chromium trioxide-containing catalyst by heating same in various oxidizing gases, and then polymerizing ethylene with the thus-activatde catalyst, the melt index of the polymers obtained varies in an unexpected manner when the activating gas contains from 7 to no more than 19 mol percent oxygen. More specifically, FIG. 1 shows that at point 1 where the activating gas is 100 percent oxygen, the polyethylene obtained had a melt index of 1.03, and at point 2 where the activating gas was air (21 mol percent oxygen) the melt index of the polyethylene obtained was 1.97. From these two points, one would expect that with amounts of oxygen less than 21 mol percent, the melt index of the resulting polyethylene would increase, but would increase generally on the order of magnitude plotted by dotted line 3. However, it was surprisingly found that there was an unexpected peaking in the melt index of the resulting polyethylene which is represented by curve 4.

The unexpected peak was found when the chromium trioxide-containing catalyst was activated in the same manner as for points 1 and 2, except that the activating gas used contained 11 mol percent oxygen (point 5 of FIG. 1) and 8.1 mol percent oxygen (point 6 of FIG. 1). When 11 and 8.1 mol percent oxygen were employed, the melt indices of the polymer obtained were, respectively, 2.28 and 2.49. It was then even more surprisingly found that when activating the chromium trioxide-containing catalyst in the same manner as points 1, 2, 5 and 6, but using an activating gas containing 5.7 mol percent oxygen, polyethylene with a melt index of only 1.78 was obtained (point 7 of FIG. 1).

Thus, it can be seen from FIG. 1 that when the activating gas contains from 7 mol percent (point 8 in FIG. 1) to no more than 19 mol percent (point 9 in FIG. 1) oxygen, unexpected increases in melt index are obtained in the polymer produced from the thus-activated catalyst. Although an activating gas containing from 7 to 19 mol percent oxygen can be employed to obtain the unexpected results of this invention, other preferred oxygen mol percent ranges for this invention include 7 to 15 and 8 to 15 mol percent oxygen based on the total activating gas. If it is desired to consistently obtain a polymer having a melt index in excess of 2.2, it is preferred to employ an oxygen mol percent range in the activating gas of 8 to 11.

Figure 2:
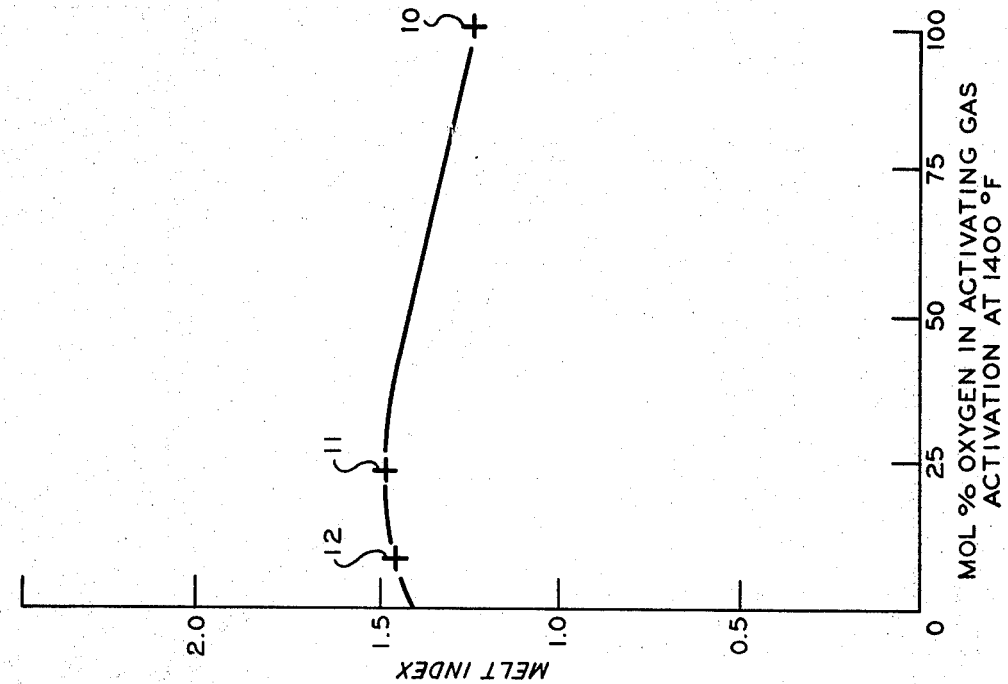
FIG. 2 is a curve showing that the unexpected results of this invention are not obtained using an activation temperature below 1500° F.

FIG. 2 shows that when a catalyst containing chromium trioxide was activated at a temperature below 1500° F. using activating gases containing varying mol percentages of oxygen, the unexpected melt index increase of the polyethylene obtained with the thus-activated catalyst was not obtained. More specifically, when using pure oxygen (point 10 of FIG. 2) the melt index of the polyethylene obtained was 1.26, while with air (point 11 of FIG. 2) the melt index of the polyethylene obtained was 1.47. With an activating gas containing 8 mol percent oxygen (point 12 of FIG. 2) the melt index of the polyethylene obtained actually decreased from 1.48 at point 11 to 1.42 at point 12.

Thus, activating temperatures of at least about 1500° F., preferably from about 1500 to about 1800° F., more preferably from about 1500 to about 1700° F., still more preferably from about 1550 to about 1650° F., should be used to obtain the unexpected results of this invention.

According to this invention, the catalytic composition employed should contain an effective catalytic amount of chromium oxide, a portion of which preferably contains at least some chromium in the hexavalent state. The amount of chromium present can be in the range of from about 0.1 to about 50 weight percent based on the total weight of the catalytic composition, and the amount of hexavalent chromium present can be at least 0.1 weight percent based on the total weight of the catalytic composition. The remainder of the catalytic composition can be at least one of silica, alumina, zirconia, and thoria.

The catalyst can be prepared by impregnation of the silica, alumina, silica-alumina, and the like with a solution of chromium trioxide or a compound convertible to chromium oxide by calcination.

The thus-formed catalytic composition is then activated by heating in the above-disclosed temperature ranges for at least one minute, preferably from about one minute to about 48 hours, while in contact with the above-described activating gas. The activating gas can contain a substantially inert portion and an oxidizing portion, the substantially inert portion being substantially inert to the oxidizing portion of that gas and to the catalytic composition with which the gas is in contact. The substantially inert portion of the activating gas can be composed of at least one of carbon dioxide, nitrogen, helium, neon, argon, krypton, and xenon. The oxidizing portion of the activating gas can be composed of at least one of atomic oxygen, ozone, molecular oxygen and air. It is presently preferred that the activating gas be relatively dry, i.e., contain less than 5 parts per million of water.

After the activation process, the catalyst can be used in a polymerization process (the catalyst having been activated in situ in the polymerization reactor or promptly transferred to the polymerization reactor after activation) or the catalyst can be stored at ambient temperature under substantially anhydrous conditions in an atmosphere containing no more oxygen than was present in the activating gas mixture until its use is desired.

The catalyst can be used to polymerize any monomers or combination of monomers that are known to be polymerizable with the chromium oxide-containing catalyst. Particularly suitable monomers for polymerization with the catalyst of this invention are mono-1-olefins (1-olefins) containing from 2–8 carbon atoms per molecule, inclusive. The polymerization process employed is simply that of contacting the monomer or monomers to be polymerized with an effective catalytic amount of the catalyst of this invention in the presence or absence of suitable known diluents or solvents, and under conditions of temperature, pressure and the like, effective for the polymerization process. Full and complete disclosures of suitable polymerization processes including diluents, solvents and conditions of temperature, pressure, and the like can be found in the above-referred U.S. Pat. 2,825,721 and British Pat. 853,414.

EXAMPLE

A commercial chromium oxide-silica catalyst of the Davison Chemical Company (Davison 969–MS), prepared by impregnating a porous microspheroidal silica containing about 0.1 weight percent alumina based on the weight of the silica with aqueous chromium trioxide ($CrO_3$) solution, and drying the impregnated silica for several minutes in air at 300 to 500° F., was used. The final catalyst contained 2.1 weight percent chromium trioxide.

The catalyst was activated by heating same for five hours at 1600° F. in a dry (less than 5 parts per million water) activating gas. The gas used was either pure oxygen (point 1 of FIG. 1) or air diluted with nitrogen (points 2, 5, 6 and 7 of FIG. 1).

The thus-activated catalyst was then employed for polymerizing ethylene. The polymerization process used a 2-liter reactor which was warmed to about 225° F., flushed with nitrogen, cooled to 150° F., and flushed with isobutane. Thereafter, above 0.065 grams of the activated catalyst was added to the reactor followed by 567 grams of isobutane. The temperature of the reactor was adjusted to 230° F. and ethylene was added in amounts sufficient to raise the pressure in the reactor to 500 p.s.i.g. and to maintain that pressure during the polymerization process. The polymerization run lengths varied from 80 to 100 minutes, depending upon the polymer yield. The results of the polymerization runs were as follows:

TABLE I

| Corresponding point on Figure 1 | Oxygen content of activating gas, mol percent | Productivity, lb. polymer/ lb. catalyst | Melt Index |
|---|---|---|---|
| 1 | 100 | 4,945 | 1.03 |
| 2 | 21 | 5,100 | 1.97 |
| 5 | 11 | 5,000 | 2.28 |
| 6 | 8.1 | 5,000 | 2.49 |
| 7 | 5.7 | 5,240 | 1.78 |

To obtain points 10, 11 and 12 of FIG. 2, the same catalyst as described hereinabove in this example was employed, but was activated by heating for five hours at 1400° F. in dry oxygen (point 10 of FIG. 2) or air diluted with nitrogen (points 11 and 12 of FIG. 2), all activating gases employed in each run contain less than 5 parts per million of water.

The thus-activated catalysts were employed in the same polymerization process as set forth hereinabove in this example except that the polymerization run lengths varied from 120 to 140 minutes depending upon the polymer yield. Results of these runs were as follows:

TABLE II

| Corresponding point on Figure 1 | Oxygen content of activating gas, mol percent | Productivity, lb. polymer/ lb. catalyst | Melt Index |
|---|---|---|---|
| 10 | 100 | 4,490 | 1.26 |
| 11 | 21 | 5,030 | 1.47 |
| 12 | 8 | 5,145 | 1.42 |

From the foregoing it can be seen that in order to obtain the unexpected results of this invention, the activating gas must contain from 7 to no more than 19 mol percent oxygen based on the total activating gas, and the activation temperature must be greater than 1400° F.

Reasonable variations and modifications are possible within the scope of this disclosure without departing from the spirit and scope thereof.

We claim:
1. In a method for preparing a composition for use as a catalyst, said composition comprising chromium oxide and at least one of silica, alumina, zirconia and thoria, at least a portion of said composition comprising chromium in the hexavalent state, the improvement comprising heating said composition at a temperature of from about 1500 to about 1800° F. for at least one minute in contact with a gas containing oxygen, said oxygen being present in said gas in an amount from 7 to no more than 19 mol percent of the total gas.

2. The method as defined in claim 1 wherein chromium is present in said composition in an amount from about 0.1 to about 50 weight percent of the total weight of the composition.

3. The method as defined in claim 1 in which at least 0.1 weight percent based on the total weight of the composition is chromium in the hexavalent state.

4. The method as defined in claim 1 in which said gas contains one of carbon dioxide, nitrogen, helium, neon, argon, krypton and xenon.

5. The method as defined in claim 1 in which said gas consists substantially of oxygen and nitrogen and said composition is heated at a temperature of from about 1500° F. to about 1700° F.

6. The catalyst as produced in accordance with claim 1.

7. The method as defined in claim 5 in which said gas contains from about 8 to about 11 mol percent oxygen based on the total gas.

8. The catalyst as produced in accordance with claim 5.

9. In a method for polymerizing at least one 1-olefin having from 2 to 8 carbon atoms per molecule, inclusive, wherein said 1-olefin is contacted with a catalyst, the improvement comprising contacting said 1-olefin under polymerization conditions with an effective catalytic amount of the catalyst of claim 6.

10. The method of claim 9 wherein said 1-olefin is at least one of ethylene, propylene and 1-butene.

References Cited
UNITED STATES PATENTS

| | | | |
|---|---|---|---|
| 2,825,721 | 3/1958 | Hogan et al. | 260—94.9 |
| 3,281,405 | 10/1966 | Hogan | 260—94.9 |

JOSEPH L. SCHOFER, Primary Examiner

E. J. SMITH, Assistant Examiner

U.S. Cl. X.R.

252—458; 260—88.2, 94.9